Oct. 13, 1964     F. WILLIAMS     3,152,496

ROTARY WORK HOLDERS

Filed Sept. 12, 1962

United States Patent Office 3,152,496
Patented Oct. 13, 1964

3,152,496
ROTARY WORK HOLDERS
Frederick Williams, Coventry, England, assignor to Wickman Machine Tool Manufacturing Company Limited, Coventry, England
Filed Sept. 12, 1962, Ser. No. 223,036
Claims priority, application Great Britain Sept. 21, 1961
2 Claims. (Cl. 82—40)

The object of this invention is to provide in a convenient form a rotary work holder, whereby the release and engagement of the workpiece is facilitated.

A work holder comprising in combination a hollow body part which at one end is adapted for connection to a rotary spindle a member mounted within the body part, a uni-directional clutch interconnecting the body part and the member, and means for retaining a work piece in driving engagement with a part of the member extending from the body part.

Figure 1:
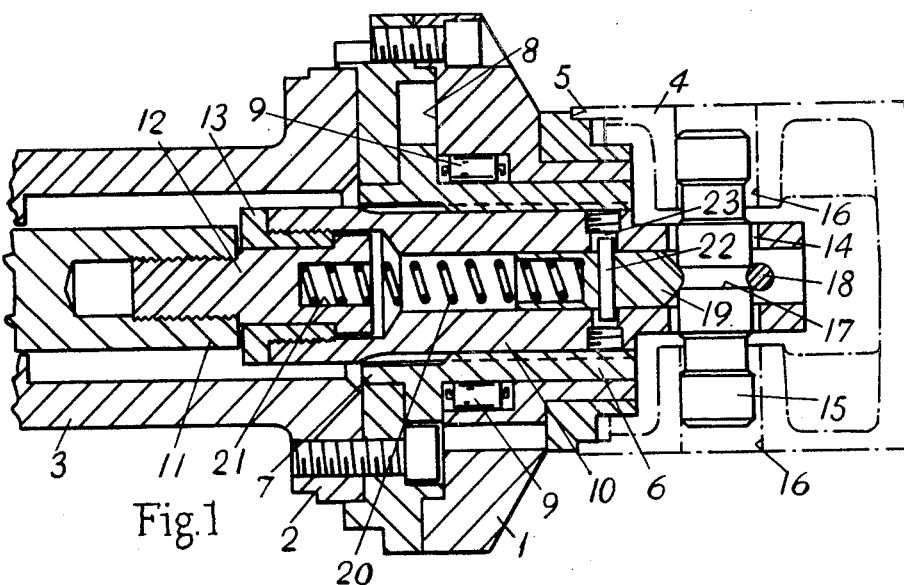
Figure 2:
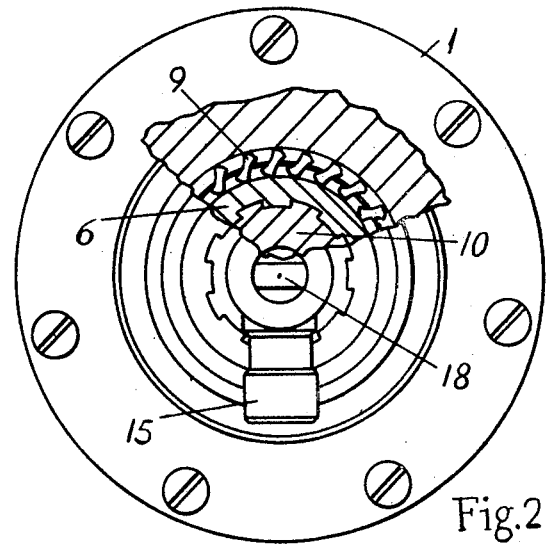

In the accompanying drawings:

FIGURE 1 is a part sectional side elevation of an example of a rotary work holder in accordance with the invention showing a workpiece in position and FIGURE 2 is a part sectional end view of the example shown in FIGURE 1 with the workpiece removed.

Referring to the drawings there is provided a hollow body part 1 which at one end is adapted to be bolted to a flange 2 on the end of a hollow driving spindle 3 of a lathe. The other end of the body part, which is conveniently formed as a plurality of interconnected sections, is shaped to fit closely within the skirt 4 of an engine piston workpiece, and is formed with a peripheral shoulder 5 against which the end of the skirt can bear so as to provide both axial and radial location for the workpiece.

Within the body part is a relatively rotatable and internally splined sleeve 6 which is prevented from relative axial movement by a peripheral flange 7 thereon engaging a recess 8 formed between two sections of the body part 1. Moreover, between the sleeve 6 and body part 1 is a uni-directional clutch 9 of any convenient form.

The splines of the sleeve 6 are in engagement with complementary splines formed on a contained nose piece 10 which is rlatively movable in an axial direction by means of a draw bar 11 extending through the driving spindle 3, one end of the nose piece being secured to the adjacent end of the draw-bar by means of an axially disposed bolt 12 passing through a screw-threaded plug 13 engaged within a complementary screw-threaded recess at the end of the nose piece.

The opposite end of the nose piece extends from the body part, and is provided with an eye 14 to receive a transversely disposed pin 15. The pin is of such dimensions that it can pass freely through the gudgeon pin bores 16 in the workpiece into the eye when the nose piece is at the forward limit of its travel, but when the nose piece is retracted the pin by engagement with the walls of the bores will hold the workpiece firmly on its location on the body part. Moreover, at the middle of the pin is a circumferential groove 17 for engagement with a transversely disposed peg 18 or rib at one side of the eye and a spring-loaded plunger 19 at a diametrically opposite position, the peg and plunger serving to locate the pin against axial movement when correctly positioned in the eye. The plunger 19 is axially slidable within the nose piece, and is urged into the eye by a coiled compression spring 20 disposed between it and the base of a recess 21 in the bolt 12. Moreover, a transverse peg 22 in the plunger, by co-operation with a shoulder 23 in the nose piece, limits movement of the plunger into the eye.

When it is required to engage a workpiece with the holder the eye 14 is manually rotated in one direction, as permitted by the uni-directional clutch 9, until it is at an angular setting most convenient for the introduction of the pin 15 therethrough. With the nose piece 10 forward, a workpiece is then introduced on to its location on the body part with its gudgeon pin bores 16 aligned with the eye. The pin is inserted through the bores into the eye until it is located by the plunger 19 in co-operation with the peg 18 or rib. The nose piece is then retracted to hold the work piece on its location. The spindle 3 can then be driven to rotate the work piece about its axis, this drive being imparted through the clutch 9 to the nose piece 10, and from the latter to the workpiece through the pin 15.

When the required operation has been performed on the workpiece the spindle 3 is stopped, and the nose piece 10 is moved forwardly. Whereafter the uni-directional clutch 9 permits the workpiece together with the nose-piece to be moved to the angular position most appropriate for the removal of the pin 15 prior to unloading the workpiece.

Having thus described my invention what I claim as new and desire to secure by Letters Patent is:

1. A work holder for pistons comprising a body part mountable on a machine spindle and providing a location for a piston, a member mounted within the body part and movable axially relative thereto, a pin engageable transversely through the member and the piston for retaining the piston against the location, when the member is moved axially relative to the body part in one direction, a sleeve surrounding the member and in spline engagement therewith so as to permit relative axial movement, means for preventing relative axial movement of the sleeve and the body part, and a uni-directional clutch serving to interconnect the body part and the sleeve.

2. A work holder for pistons comprising a body part mountable on a machine spindle and providing a location for a piston, a hollow member mounted within the body part and movable axially relative thereto, a peg extending transversely through the member, a pin extending through the member and piston, said pin being prevented from angular movement relative to the member but permitted axial movement relative thereto, resilient means urging the pin into contact with the peg so that as the member is moved axially in one direction the pin will urge the piston against said location, a sleeve surrounding the member and in spline engagement therewith so as to permit relative axial movement, means for preventing relative axial movement of the sleeve and the body part, and a uni-directional clutch serving to interconnect the body part and the sleeve.

References Cited in the file of this patent
UNITED STATES PATENTS

| 952,466 | Pierce | Mar. 22, 1910 |
| 2,119,004 | Bowser | May 31, 1938 |
| 2,146,774 | Snader | Feb. 14, 1939 |

FOREIGN PATENTS

| 14,141 | Great Britain | Aug. 21, 1891 |